(12) United States Patent
Stefani et al.

(10) Patent No.: US 11,088,590 B2
(45) Date of Patent: Aug. 10, 2021

(54) CONNECTION UNIT FOR A WIPER MOTOR AND WIPER MOTOR

(71) Applicant: Valeo Systèmes d'Essuyage, Le Mesnil Saint Denis (FR)

(72) Inventors: Siegfried Stefani, Bietigheim-Bissingen (DE); Christof Heuberger, Bietigheim-Bissingen (DE); Harald Kapitza, Bietigheim-Bissingen (DE); David Rignault, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 440 days.

(21) Appl. No.: 16/063,073

(22) PCT Filed: Dec. 14, 2016

(86) PCT No.: PCT/EP2016/080884
§ 371 (c)(1),
(2) Date: Jun. 15, 2018

(87) PCT Pub. No.: WO2017/102783
PCT Pub. Date: Jun. 22, 2017

(65) Prior Publication Data
US 2020/0290569 A1    Sep. 17, 2020

(30) Foreign Application Priority Data

Dec. 17, 2015  (DE) .......................... 102015122095.4

(51) Int. Cl.
*H02K 5/22*    (2006.01)
*H02K 5/14*    (2006.01)
(Continued)

(52) U.S. Cl.
CPC ................ *H02K 5/225* (2013.01); *B60S 1/08* (2013.01); *H01R 13/245* (2013.01); *H02K 5/148* (2013.01);
(Continued)

(58) Field of Classification Search
CPC .. H02K 5/00; H02K 5/08; H02K 5/14; H02K 5/148; H02K 5/22; H02K 5/225;
(Continued)

(56) References Cited

U.S. PATENT DOCUMENTS 5,453,649 A * 9/1995 Blanchet ................... B60S 1/08
310/71
5,576,586 A * 11/1996 Blumenberg ......... B60T 8/4022
310/239

(Continued)

FOREIGN PATENT DOCUMENTS

CN       105052017 A      11/2015
DE    102005047428 A1      4/2007
(Continued)

OTHER PUBLICATIONS

International Search Report issued in PCT/EP2016/080884 dated Mar. 20, 2017 (2 pages).

(Continued)

*Primary Examiner* — Tran N Nguyen
(74) *Attorney, Agent, or Firm* — Osha Bergman Watanabe & Burton LLP (57) ABSTRACT

The invention relates to a connection unit (20; 20*a*) for a wiper motor (100) for windshield wiper systems, with a plug connector element (22) for the reception of electric connection lines (24), which are formed for the at least indirect contacting of a commutator (6) of an electric motor (1), and with a carrier element (26; 26*a*) in which connection ele-
(Continued)

ments (40) for contacting the commutator (6) and/or at least one component of an electric circuit are arranged.

17 Claims, 6 Drawing Sheets

(51) Int. Cl.
  *H02K 11/21*   (2016.01)
  *H02K 11/38*   (2016.01)
  *H01R 13/24*   (2006.01)
  *H02K 7/116*   (2006.01)
  *B60S 1/08*    (2006.01)

(52) U.S. Cl.
  CPC ............ *H02K 7/1166* (2013.01); *H02K 11/21* (2016.01); *H02K 11/38* (2016.01)

(58) Field of Classification Search
  CPC ... H02K 7/00; H02K 7/04; H02K 7/11; H02K 7/116; H02K 7/1166; H02K 11/00; H02K 11/04; H02K 11/38; H02K 23/00; H02K 23/04; H02K 23/66; B60S 1/00; B60S 1/08; B60S 1/16; B60S 1/166; H01R 31/00; H01R 31/06; H01R 27/00; H01R 39/00; H01R 39/38; H01R 39/383
  See application file for complete search history.

(56) References Cited

U.S. PATENT DOCUMENTS

| | | | |
|---|---|---|---|
| 7,109,617 B2 | 9/2006 | Mizutani et al. | |
| 7,345,391 B2* | 3/2008 | Bradfield | H02K 5/10 |
| | | | 310/68 R |
| 2004/0066111 A1* | 4/2004 | Torii | H02K 5/148 |
| | | | 310/239 |
| 2005/0264127 A1* | 12/2005 | Benkert | H02K 11/026 |
| | | | 310/239 |
| 2009/0134743 A1* | 5/2009 | Hornung | H02K 11/026 |
| | | | 310/244 |

FOREIGN PATENT DOCUMENTS

| | | |
|---|---|---|
| EP | 0 603 083 A1 | 6/1994 |
| EP | 2 672 578 A2 | 12/2013 |
| JP | S59-141478 U | 9/1984 |
| WO | 2014/148602 A1 | 9/2014 |

OTHER PUBLICATIONS

Written Opinion issued in PCT/EP2016/080884 dated Mar. 20, 2017 (6 pages).
The First Office Action issued in corresponding Chinese Patent Application No. 201680074310.5, dated Jun. 27, 2019 (13 pages).

* cited by examiner

CONNECTION UNIT FOR A WIPER MOTOR AND WIPER MOTOR

PRIOR ART

The invention relates to a connection unit for a wiper motor for windshield wiper systems according to the preamble of claim 1. Furthermore, the invention relates to a wiper motor using a connection unit according to the invention.

A connection unit for a wiper motor having the features of the preamble of claim 1 is known from U.S. Pat. No. 7,109,617 B2. The known connection unit comprises a plug connector element for the reception of electric connection lines, wherein the plug connector element is connected to a carbon brush holder plate. The construction unit consisting of the carbon brush holder plate and the plug connector element is connected to a gearbox. An element, usually a gear wheel, driven by an electric motor is provided inside the gearbox, wherein it is possible by means of resistance tracks arranged at the gear wheel to detect the position of the gear wheel, and thus the position of a wiper arm, for example, by contacting the resistance tracks with contacts formed as sliding contacts. Due to the fact that in U.S. Pat. No. 7,109,617 B2 the connection unit is arranged in an area spaced at a relatively large distance from the gear wheel inside the gearbox, it is necessary to connect the connection unit to the contact or the sliding contact via additional connections. Such an approach involves a relative high manufacturing or mounting effort and is subject to errors.

DISCLOSURE OF THE INVENTION

Based upon the described prior art, the object underlying the invention is to develop a wiper motor for windshield wiper systems according to the preamble of claim 1 in such a way that a safe and reliable detection of the rotary angular position of a drive element, in particular a gear wheel of the wiper motor, is made possible in a relatively simple structural configuration.

According to the invention, in a connection unit for a wiper motor for windshield wiper systems having the features of claim 1, this object is essentially achieved in that at least one contact for the detection of a rotary angular position of a drive element, in particular a gear wheel, driven by the electric motor is provided on the carrier element. In other words, this means that the carrier element of the connection unit comprises an additional contact fixedly connected to the carrier element, which—during the mounting process of the connection unit to the wiper motor, in particular on the gearbox thereof—simultaneously and directly, i.e. without additional bridging components, gets into engagement with or electrically-conductive contact to a counter element, in particular a resistance track, arranged on the drive element and interacting with the at least one additional contact.

Advantageous developments of the connection unit according to the invention are indicated in the sub-claims.

In an embodiment of the connection unit preferred in terms of the manufacture thereof, the plug connector element, which serves as a carrier of electric connection lines for the contacting of the connection unit or of the wiper motor, is directly connected to the carrier element together with the electric connection lines.

In order to allow a safe electric contacting of the at least one contact for the detection of the rotary angular position of the drive element with the drive element in the mounting process of connection unit, it is preferably provided that the at least one contact is formed as a spring-loaded contact with an elastically formed end section. Thus, this end section rests against its mating contact on the drive element in a pre-loaded manner in the mounted state of the connection unit in the wiper motor.

In particular, it may be provided that the at least one contact is connected to a lead frame element, which forms a connection line. Such a lead frame element provides the advantage that it can be adapted to the respective application or the respective structural design and arrangement of the drive element in a particularly simple manner.

In a further preferred embodiment of the connection unit, it is provided that the carrier element of the connection unit is connected to the carbon brush holder plate by means of a latch connection, wherein electric connection elements interacting with one another are formed on the carrier element and the carbon brush holder plate.

The invention also comprises a wiper motor for windshield wiper systems, wherein the wiper motor has an electric motor comprising a drive shaft, wherein the drive shaft interacts with a gear wheel inside a gearbox, and wherein the wiper motor comprises an above-described connection unit according to the invention.

The embodiment of the gearbox with a reception and an insertion opening, into which the connection unit can be inserted from the outer side in the type of a drawer, is particularly preferred.

However, as an alternative, it is also conceivable that the gearbox comprises at least one opening, into which the at least one contact of the connection unit protrudes, wherein the connection unit is connected to the gearbox at the outer side of the gearbox in the area of a face side of the connection unit.

In a further development of the last named principle of the invention, it is provided that the opening is covered by the connection unit if the connection unit is mounted.

In order to minimize the physical distance between the connection unit and the area of the gear wheel, arranged to be engaging with the at least one contact, it is further provided that the connection unit in the mounted state in the gearbox is arranged at a partial overlap with the gearwheel.

In order to simplify the mounting process between the connection unit and the reception in the gear box, it is provided that guidance means for guiding the connection unit during the insertion into the reception are provided in the area of the reception and the connection unit. Such guidance means facilitate or simplify the mounting process and exclude erroneous installation leading to potential damages.

Furthermore, it is particularly preferred if a latch connection is formed between the gearbox and the connection unit in the mounting position of the connection unit. Thus, the connection unit can be mounted to the gearbox without tools.

In order to allow for a media-tight configuration of the wiper motor, it is furthermore provided that the gearbox consists of metal and the connection unit at least sectionally consists of plastic, and in that in the mounted state of the connection unit, the area between the gearbox and the connection unit is closed with a sealant in a media-tight manner.

Further advantages, features and details of the invention result from the following description of preferred exemplary embodiments as well as by means of the drawing.

The drawing shows in:

FIG. 1 the essential components of a wiper motor for a windshield wiper system in an exploded view, FIG. 2 the wiper motor according to FIG. 1 in a partially mounted state in a plan view, FIGS. 3 and 4 the parts of a carbon brush holder plate and a connection unit prior to and after the connection in a perspective view, FIG. 5 parts of the wiper motor during the insertion of the connection unit into an insertion opening of a gearbox in a perspective view, FIG. 6 an assembly consisting of a carbon brush holder plate with contacts for contacting a mating element on the gear wheel in a perspective view, FIG. 7 the components of a modified connection unit in a perspective view, and FIG. 8 a perspective illustration of a once more modified connection unit, which can be connected to a gearbox region in the type of a housing cover in a perspective illustration.

Like elements or elements having the same function are indicated with like reference numerals throughout the drawings.

Figure 1:
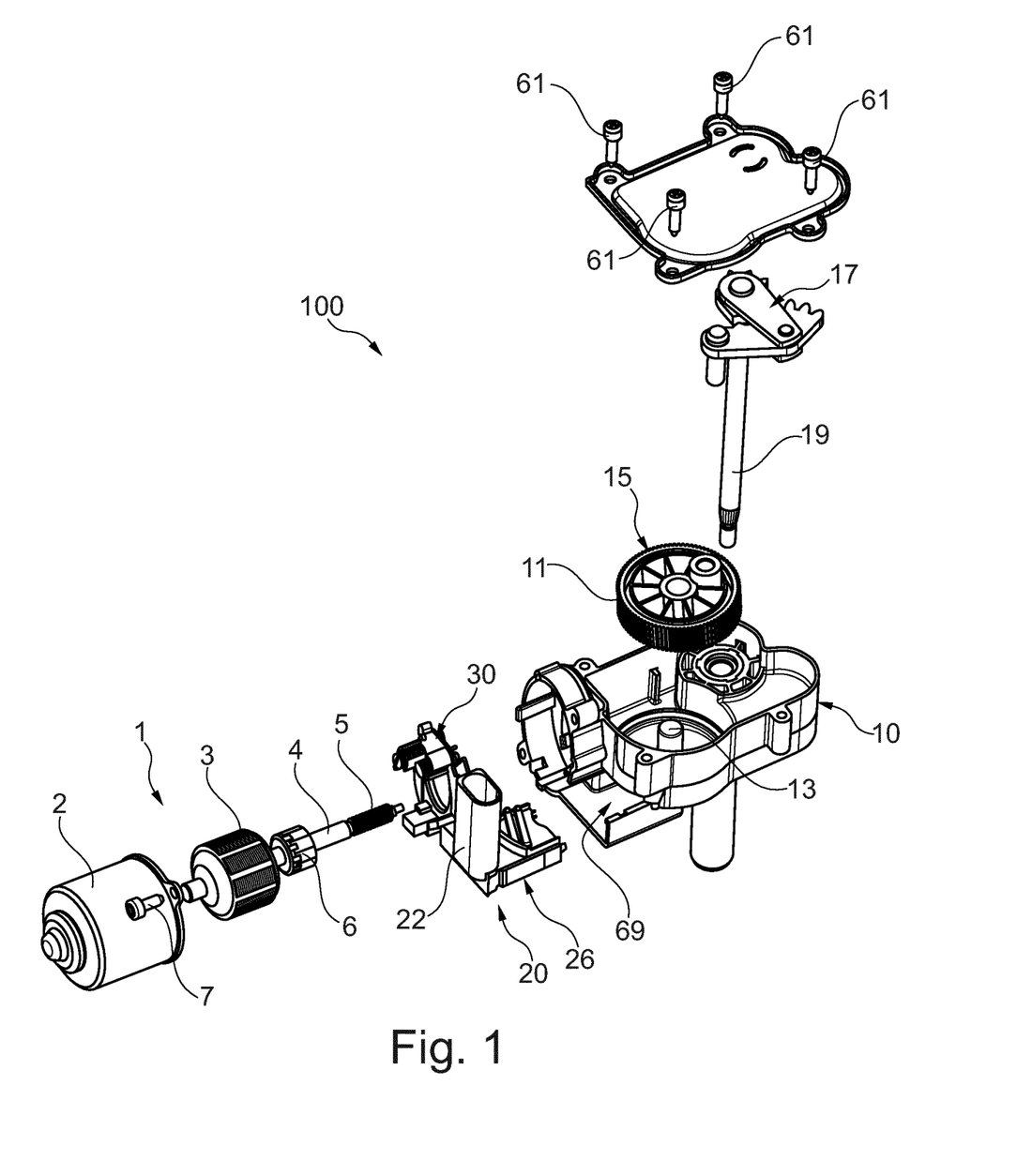
Figure 2:
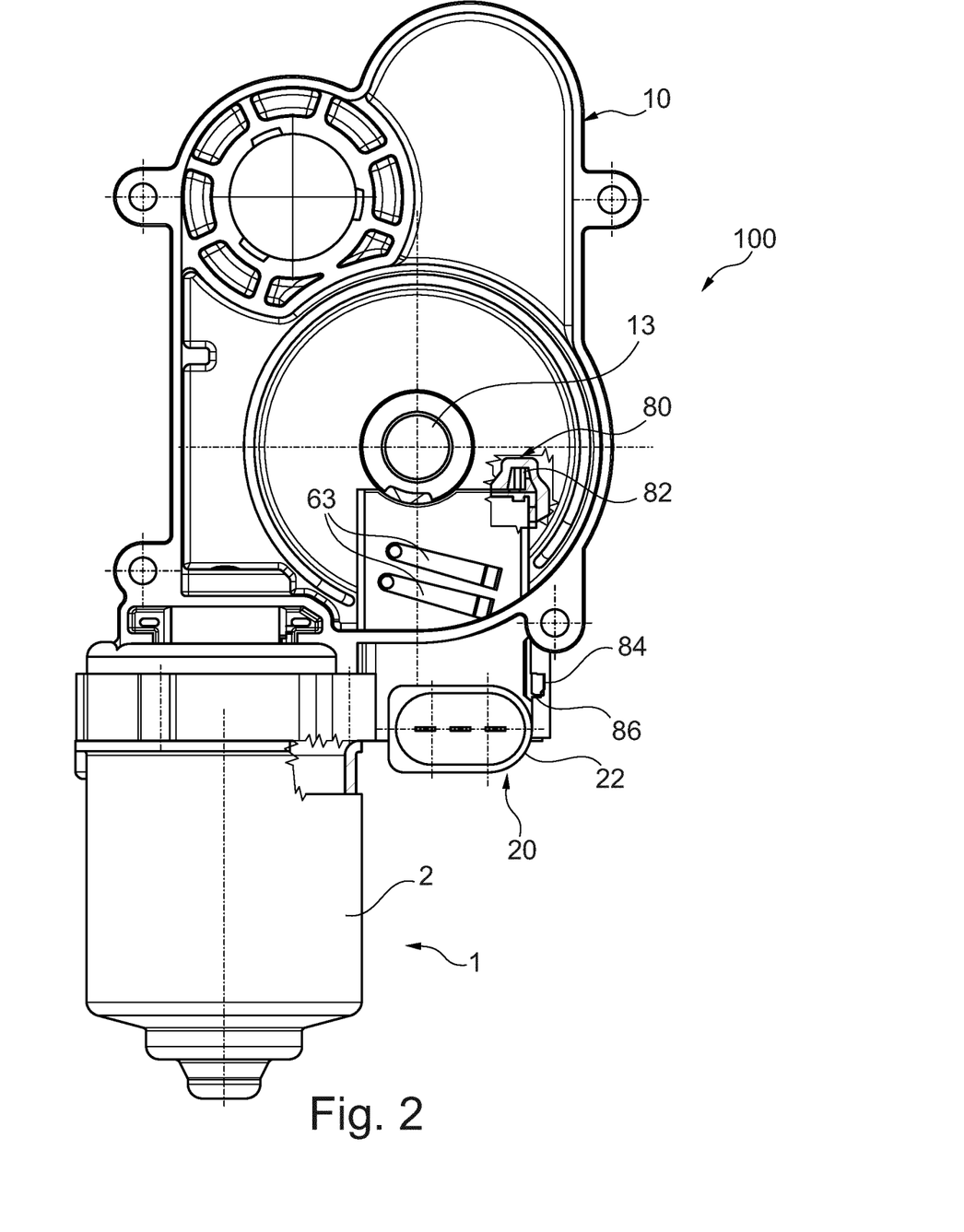

FIGS. 1 and 2 show the essential components of a wiper motor 100 serving as a part of a windshield wiper system in particular, without limitation, in the rear area of a motor vehicle for cleaning a window with a wiper arm having a wiper blade (not illustrated).

The wiper motor 100 comprises a brush-type (electric) motor 1, which has a pot-shaped motor housing 2 made of sheet metal produced as a separate component in a deep-drawing process. An anchor 3 is rotatably supported within the motor housing 2, the anchor shaft 4 acting as a drive shaft thereof protruding with a toothing section 5 into a gearbox 10 preferably consisting of a metal (aluminum) and produced in a pressure die casting method, wherein in a reception space of the gearbox 10, the toothing section 5 intermeshes with a counter toothing 11 of a gear wheel 15 rotatably supported in an axis 13 in the gearbox 10. The gear wheel 15 is at least indirectly coupled to a drive shaft 19 via a lever mechanism 17, and a wiper arm having the above-mentioned wiper blade can be fixed to the drive shaft (not shown).

Figure 6:
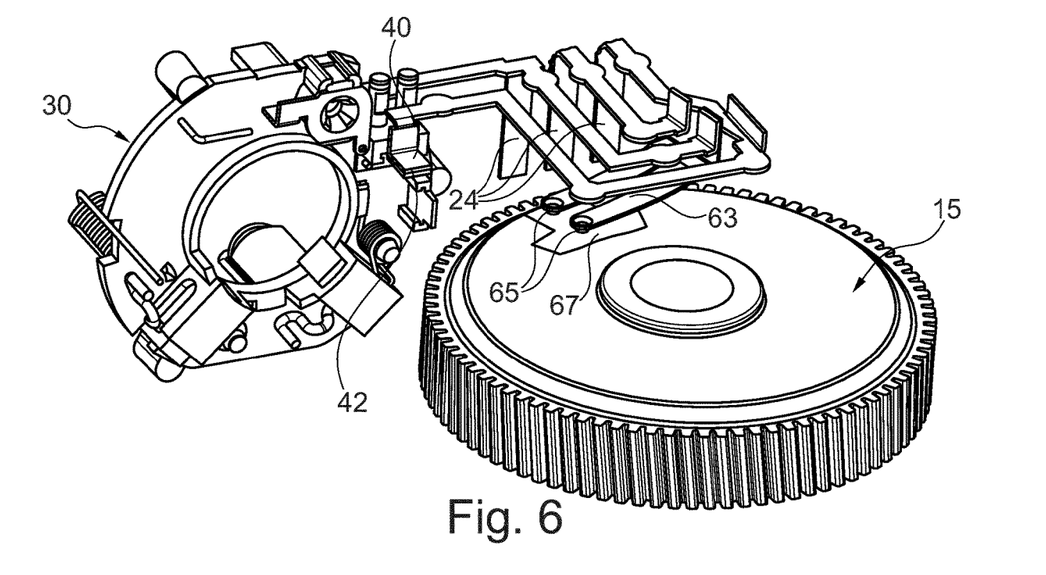

Furthermore, as can particularly be seen in conjunction with FIGS. 1 to 4, the wiper motor 100 comprises a connection unit 20 which has a plug connector element 22 for the reception of electric connection lines 24 (FIG. 6). In particular, the wiper motor 100 can be actuated via the cable tree of the motor vehicle by means of the plug connector element 22 or the electric connection lines 24. Furthermore, the connection unit 20 comprises a plate-shaped carrier element 26, which carries at least one electric or electronic component (not shown), or which is connectable to an electronic circuit, which is at least indirectly connected to the carrier element 26.

In the illustrated exemplary embodiment, the plug connector element 22, which consists of a plastic material just like the carrier element 26, is formed as an integral (monolithic) component in such a way that the electric connection lines 24 are directly connected to the plug connector element 22 and the carrier element 26 or are at least sectionally enclosed or cast-around by the material of the plug connector element 22 and the carrier element 26.

It may also be provided that the plug connector element 22 and the carrier element 26 are formed as separate components, which are connected to one another for example via a latch connection, a screw connection or another suitable connection.

Figure 3:
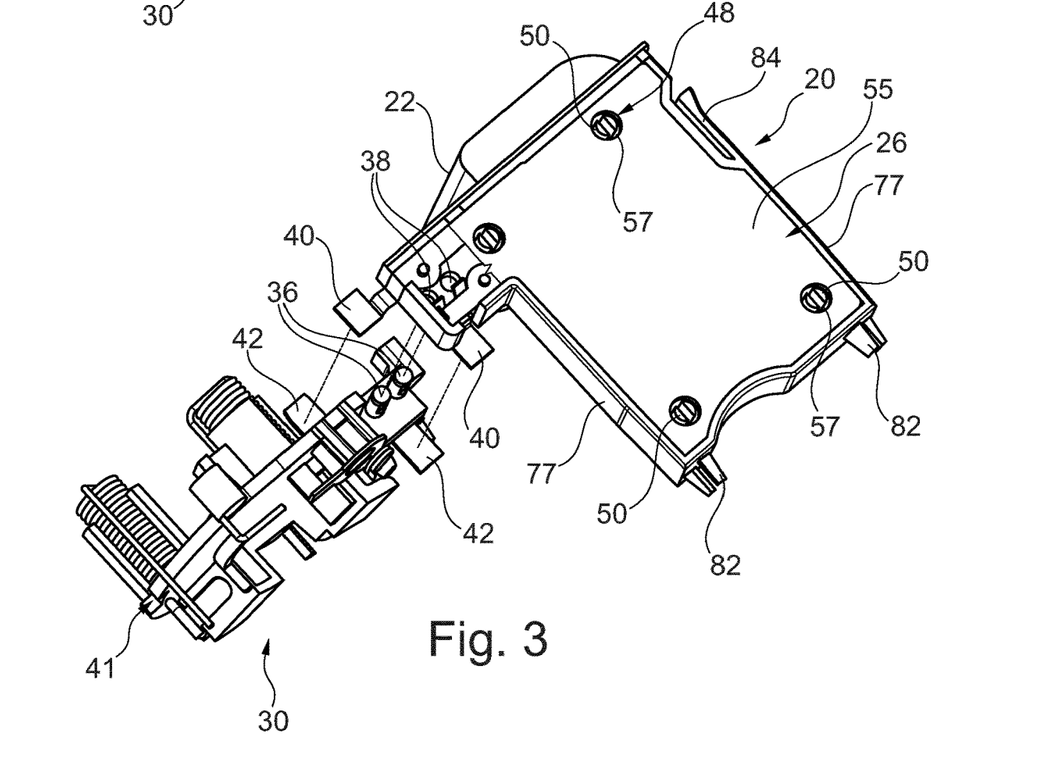
Figure 4:
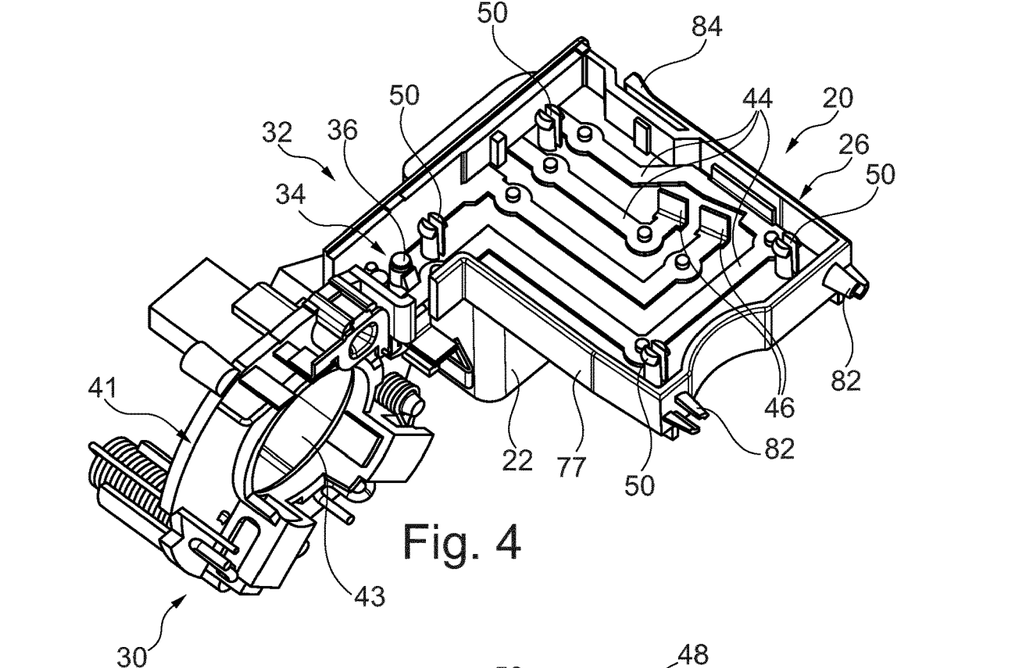

The connection unit 20 is connected to a carbon brush holder plate 30 in such a way that the carbon brush holder plate 30 and the connection plate 20 form a pre-mountable construction unit 32. To that end, a latch connection 34 is formed between the carrier element 26 and the carbon brush holder plate 30. The latch connection 34 comprises latch trunnions 36 formed on the carbon brush holder plate 30, which interact with corresponding latch openings 38 in the region of the carrier element 26 in order to form the latch connection 34 when fitting the latch trunnions 36 into the latch openings 38. Furthermore, electric connection elements 40 are provided in the area of the carrier element 26 outside the area of the latch connection 34, which are approximately shaped in the type of plates and which are at least indirectly electrically connected to the electric connection lines 24. The electric connection elements 40 interact with the electric connection elements 42 arranged in the carbon brush holder plate 30, which get into an electrically conductive contact to the electric connection elements 40 when forming the latch connection 34, for example. Here, it may be provided that the electric connection elements 40, 42 are elastically pre-bent in order to rest against one another subjected to a spring force when forming the latch connection 34.

However, it may also be possible or provided to form the connection between the connection elements 40, 42 by means of a solder, crimp or weld connection, or by any other connection technique.

The electric connection elements 42 in the carbon brush holder plate 30 serve for the electric contacting of the commutator 6 of the electric motor 1 discernable in FIG. 1.

The carbon brush holder plate 30 comprises a plate-shaped carrier region 41 with a through-opening 43 for guiding through the anchor shaft 4, wherein, if the construction unit 32 is mounted, the planes of the carrier region 41 and of the plate-shaped carrier element 26 are arranged perpendicular to one another.

Figure 7:
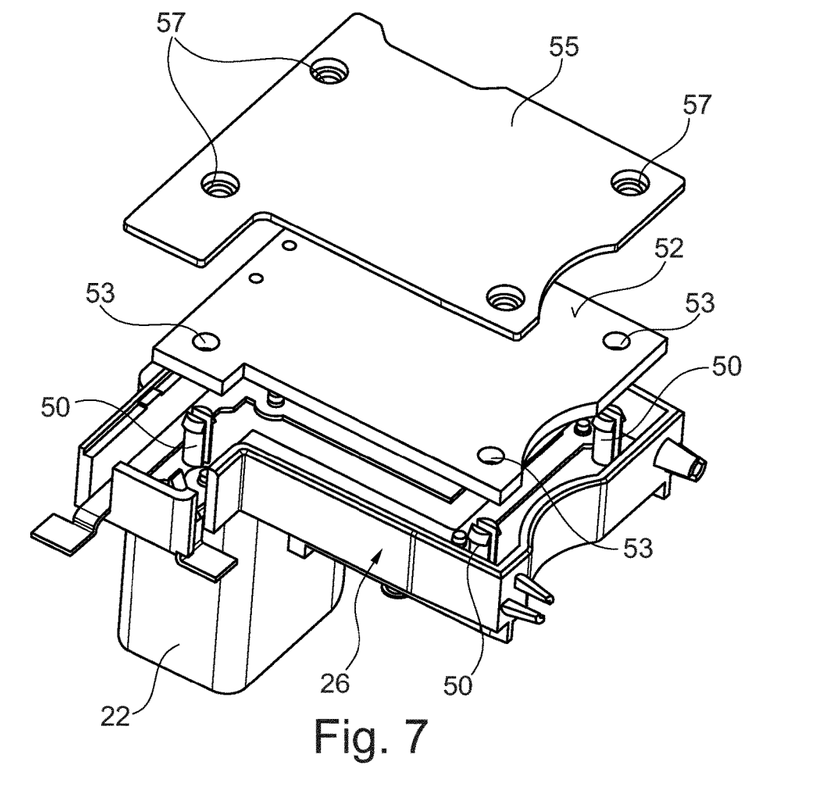

Furthermore, the carrier element 26 comprises lead frame elements 44 integrally formed with the connection lines 24 on a side 28, the end sections of which are partially formed in the type of contact sections 46 (FIG. 4). Via the contact section 46, a circuit carrier 52 merely shown in FIG. 7, which carries an electronic circuit (not shown) can be connected via another latch connection 48 with latch trunnions 50 arranged at the carrier element 26, the circuit carrier 52 comprising corresponding latch openings 53 to that end. Furthermore, it can be provided that in accordance with FIGS. 3 and 7, the circuit carrier 52 is covered or protected by means of a cover plate 55, wherein the cover plate 55 also participates in the further latch connection 48 via latch openings 57.

In order to close the reception space of the gearbox 10 after installation of the required components, the gearbox 10 further comprises a gear cover 59, which can be connected to the gearbox 10 by means of fastenings screws 62 (FIG. 1).

Figure 5:
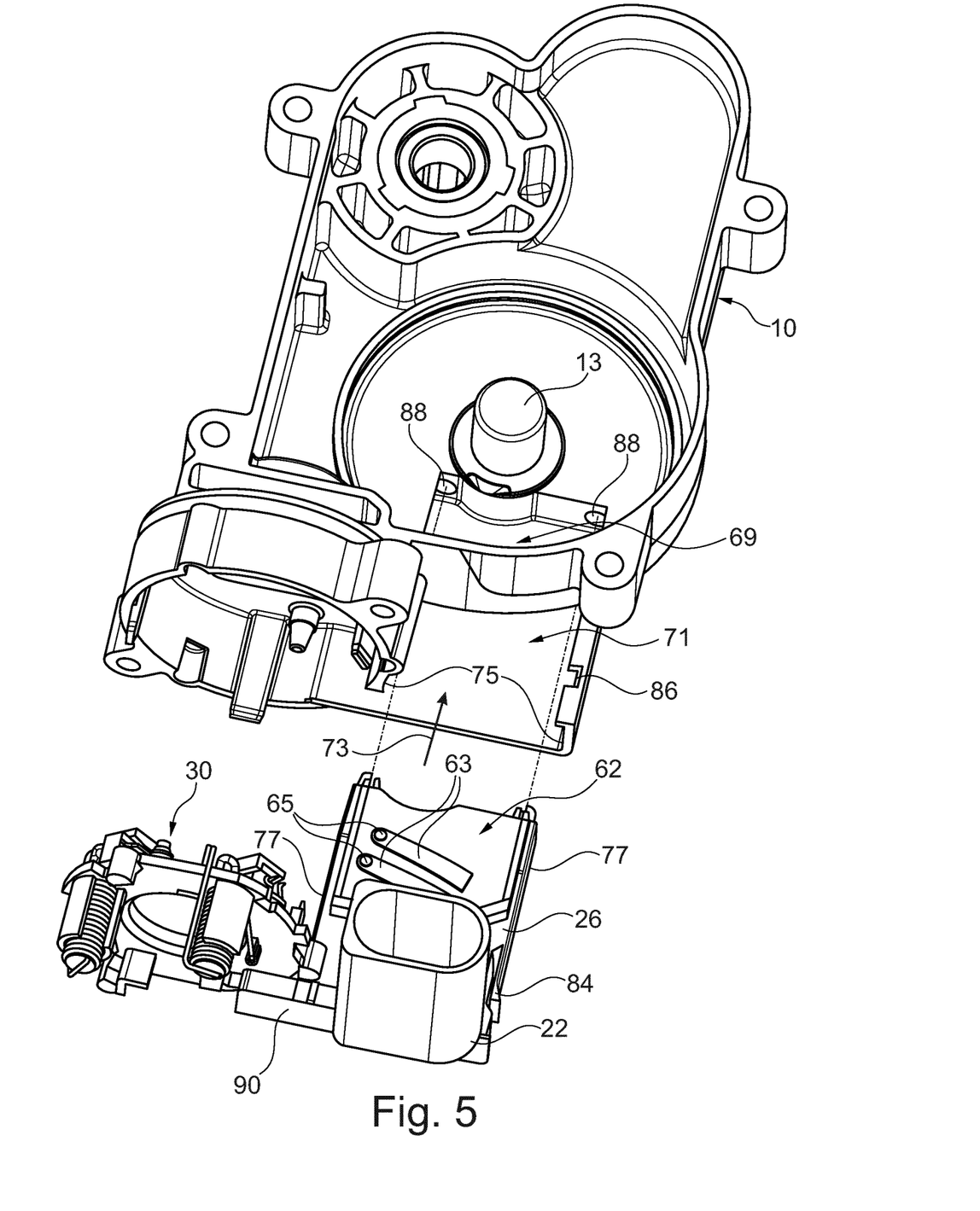

As can be discerned in particular in conjunction with FIGS. 5 and 6, two additional spring-loaded contacts 63 are provided on the side 62 of the carrier element 26 opposite the contact sections 46 in the area of the carrier element 26 in an exemplary manner, the spring-loaded contacts being electrically contacted to the electronic circuit in the area of the circuit carrier 52, for example. The contacts 63 connected to the lead frame elements 44 but against a contact element 67 arranged fixed in location to the gear wheel 15 in FIG. 6 in a spring-loaded manner with its point-shaped abutment regions 65 in the mounted state of the connection unit 20 in the gearbox 10, the contact element acting as a mating contact of the contacts 63. The position of the gear wheel 15 and thus also the position of the wiper arm and the wiper blade in the return position can be detected via the contacts 63.

The connection unit 20 in the mounted state is arranged inside the gearbox 10 in such a way that the contacts 63, in particular the abutment regions 65, are arranged at least at a partial overlap with the gear wheel 15. To that end, the gearbox 10 comprises a reception 69 with an insertion opening 71, which interacts with the connection unit 20 in the type of a drawer. As can particularly be discerned in FIGS. 2 to 5, the reception 69 comprises groove-shaped guidance elements 75 formed parallel to an insertion direction 73 interacting with mating guidance elements 77 formed at the lateral peripheral regions of the carrier element 26, in order to guide the connection unit 20 with a relatively small clearance during the insertion into the insertion opening 71. Furthermore, a latch connection 80 is formed between the connection unit 20 and the gearbox 10 in the mounted position of the connection unit 20 in the reception 69 of the gearbox 10 (FIG. 2). By way of example, the latch connection 80 includes, as can particularly be discerned in FIGS. 2 to 4, latch trunnions 82 protruding in the direction of the insertion opening 71 as well as at least one latch hook 84 arranged laterally at the carrier 26, wherein the hook interacts with a latch opening 86 (discernable in FIGS. 2 and 5), and wherein the latch trunnions 82 interact with circular latch openings 88 (also discernable in FIG. 5).

When mounting the wiper motor 100, the construction unit 32 pre-mounted from the connection unit 20 and the carbon brush holder plate 30 is inserted in the reception 69 of the gearbox 10 together with the connection unit 20 all the way until the latch connection 80 is achieved. Subsequently, for example the electric motor 10 with its motor housing 2 can be connected to the gearbox 10 by means of the fastening screws 7 discernable in FIG. 1. Here, the essential factor is that according to the illustration of FIG. 2, if the electric motor 1 or motor housing 2 is mounted, the motor housing 2 is connected to the gearbox 10 in such a way that the motor housing 2 rests against a stop surface 90 of the carrier element 26 discernable in FIG. 5 and functions there as a stop in a direction opposite to the insertion direction 73.

Figure 8:
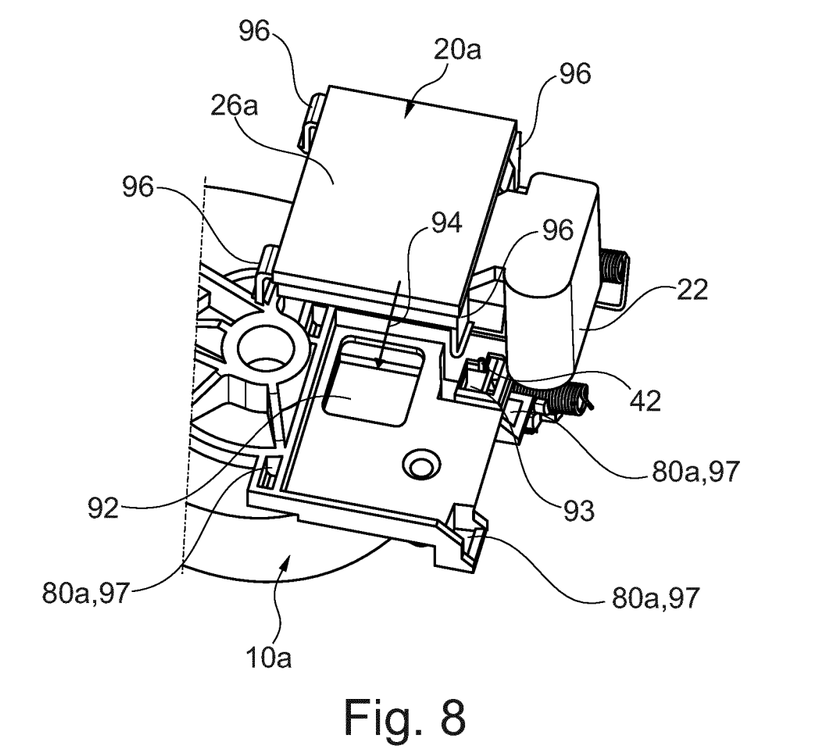

FIG. 8 shows a variant of the connection unit 20, in which the connection unit is not connected to the carbon brush holder plate 30, which is not shown in detail in FIG. 8. The connection unit 20a, in particular the carrier element 26a, is rather formed in such a way that it closes or covers two openings 92, 93 formed in the gearbox 10a at the outer side of the gearbox 10a in the mounted state. Here, one opening is formed in the region of the gear wheel 15, so that the contacts 63 are capable of interacting with the contact element 67. The other opening 93 allows contacting the connection elements 40 formed at the carrier element 26a with connection elements 42 arranged in the area of opening 93. To that end, the connection unit 20a is connected to the gearbox 10a in the direction of the arrow 94, wherein latch protrusions 96 as well as latch openings 97 are formed both at the connection unit 20a and at the gearbox 10a, in order to form a latch connection 80a.

The above-described wiper motor 100 or the connection unit 20, 20a can be modified or changed in various ways and manners without departing from the principles if the invention.

LIST OF REFERENCE NUMERALS 1 motor
2 motor housing
3 anchor
4 anchor shaft
5 toothing section
6 commutator
7 fastening screw
10, 10a gearbox
11 counter toothing
13 axis
15 gear wheel
17 lever mechanism
19 drive shaft
20, 20a connection unit
22 plug connector element
24 connection line
26, 26a carrier element
28 side
30 carbon brush holder plate
32 construction unit
34 latch connection
36 latch trunnions
36 latch opening
38 connection element
40 carrier region
41 connection element
43 through opening
44 lead frame element
46 contact section
48 latch connection
50 latch trunnion
52 circuit carrier
53 latch opening
55 cover plate
57 latch opening
59 gear cover
61 fastening screw
62 side
63 contact
65 abutment region
67 contact element
69 reception
71 insertion opening
73 insertion direction
75 guidance
77 guidance element
80, 80a latch connection
82 latch trunnion
84 latch hook
86 latch opening
88 latch opening
90 stop surface
92 opening
93 opening
94 arrow
96 latch protrusion
97 latch opening
100 wiper motor

The invention claimed is:

1. A connection unit for a wiper motor for windshield wiper systems, comprising:
   a plug connector element for the reception of electric connection lines, which are formed for at least indirect contacting of a commutator of an electric motor; and
   a carrier element in which connection elements for contacting the commutator and/or at least one component of an electric circuit are arranged, wherein at least one contact for the detection of a rotary angular position of a gear wheel driven by the electric motor is provided at the carrier element, and wherein the carrier element is connected to a carbon brush holder plate by a latch connection.

2. The connection unit according to claim 1, wherein the plug connector element is directly connected to the carrier element together with the electric connection lines.

3. The connection unit according to claim 1, wherein the at least one contact is formed as a spring-loaded contact for the generation of a preload force at a contact element.

4. The connection unit according to claim 1, wherein the at least one contact is connected to a lead frame element, which forms a connection line.

5. The connection unit according to claim 1, wherein electric connection elements interacting with one another are formed on the carrier element and the carbon brush holder plate.

6. The connection unit according to claim 1, wherein the carrier element is at least essentially formed in the type of a plate, and wherein the at least one contact and/or at least one additional contact and/or the at least one component are arranged on different sides of the carrier element.

7. The connection unit according to claim 1, wherein the carrier element is formed for receiving or fixing a circuit carrier for an electronic circuit.

8. The connection unit according to claim 1, wherein the carrier element is formed as a pre-mountable construction unit together with the carbon brush holder plate formed as a separate component.

9. A wiper motor for windshield wiper systems, comprising:

an electric motor comprising a drive shaft, wherein the drive shaft interacts with a gear wheel inside the gearbox; and a connection unit according to claim 1.

10. The wiper motor according to claim 9, wherein the gearbox comprises a reception with an insertion opening, into which at least one part of the connection unit is inserted from the outer side of the gearbox in the type of a drawer.

11. The wiper motor according to claim 9, wherein the connection unit is connected with the gearbox at the outside of the gearbox at the region of a face side of the connection unit.

12. The wiper motor according to claim 11, wherein the gearbox comprises at least one opening into which the at least one contact and the connection elements of the connection unit protrude.

13. The wiper motor according to claim 12, wherein the at least one opening is covered by the connection unit if the connection unit is mounted.

14. The wiper motor according to claim 9, wherein the connection unit in the mounted state in the gearbox is arranged at a partial overlap with the gear wheel.

15. The wiper motor according to claim 9, wherein guidance means for guiding the connection unit during the insertion into the reception in the area of the reception and the connection unit.

16. The wiper motor according to claim 9, wherein a latch connection is formed between the gearbox and the connection unit in the mounting position.

17. The wiper motor according to claim 9, wherein the gearbox consists of metal and the connection unit at least sectionally consists of plastic, and wherein in the mounting state of the connection unit the area between the gearbox and the connection unit is closed with a sealant in a media-tight manner.

* * * * *